(No Model.)
A. J. B. BERGER.
LUBRICATING CHAIN LINK.
No. 565,199. Patented Aug. 4, 1896.
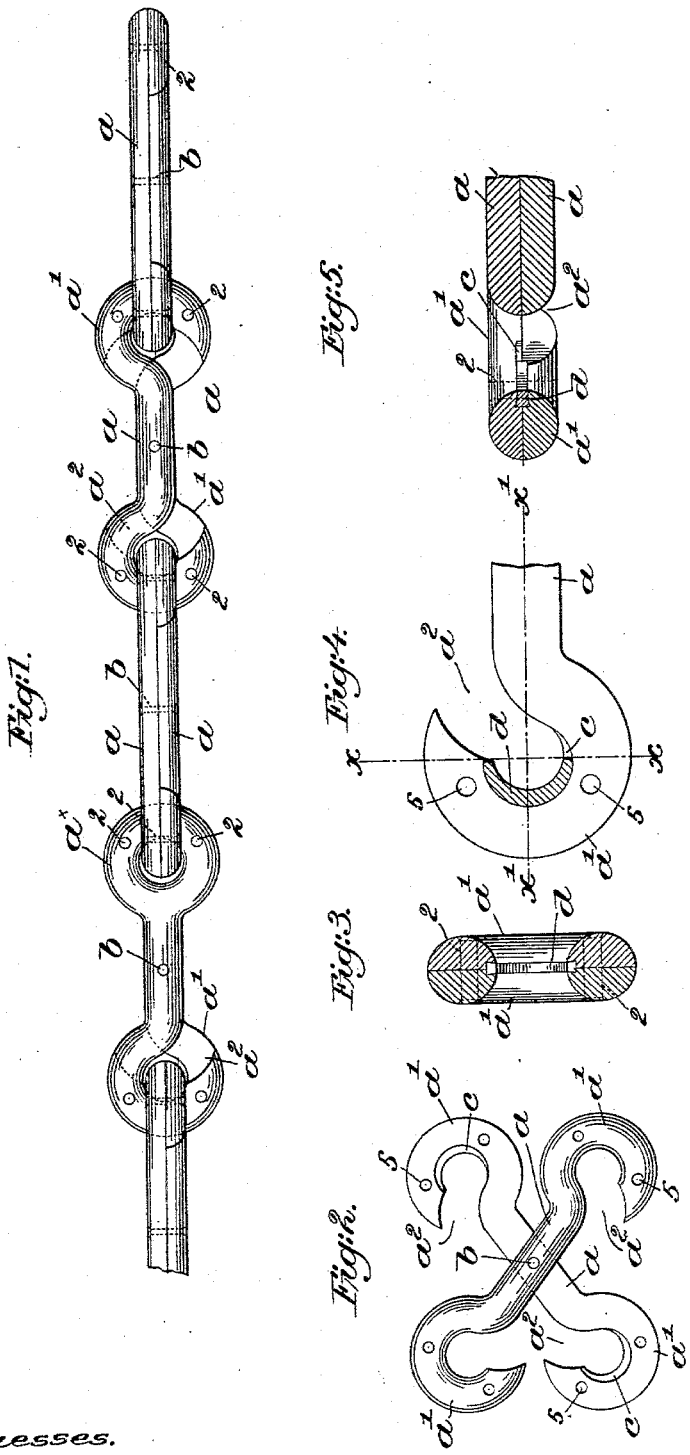
Witnesses.
Fred S. Greenleaf.
Thomas Drummond.
Inventor.
Ambrose J. B. Berger.
by Crosby & Gregory, Attys.

UNITED STATES PATENT OFFICE.

AMBROSE J. B. BERGER, OF BOSTON, MASSACHUSETTS, ASSIGNOR TO THE STEEL CABLE ENGINEERING COMPANY, OF MAINE.

LUBRICATING CHAIN-LINK.

SPECIFICATION forming part of Letters Patent No. 565,199, dated August 4, 1896.

Application filed July 27, 1894. Serial No. 518,732. (No model.)

*To all whom it may concern:*

Be it known that I, AMBROSE J. B. BERGER, of Boston, county of Suffolk, State of Massachusetts, have invented an Improvement in Lubricating Chain-Links, of which the following description, in connection with the accompanying drawings, is a specification, like letters on the drawings representing like parts.

Chains are used in many forms of apparatus wherein it is necessary or advisable, to insure ease of movement and to reduce wear, to lubricate the chains, and such lubrication is usually accomplished by the use of a liquid lubricant which must be constantly supplied in large quantities, with consequent waste and expense, irrespective of the objectionable dirt and grease communicated to the adjacent parts of the apparatus.

By means of my improvement the lubricant is reduced to a minimum in quantity, and it is so located that it is applied only to the parts most needing it, without dirt or waste.

My invention consists in certain novel features of construction to be hereinafter described, and particularly pointed out in the claims.

Figure 1 represents in elevation a sufficient portion of a chain to be understood, my invention being embodied therein. Fig. 2 is a detached view of one of the separable links, its two parts being open. Fig. 3 is a vertical section on a larger scale, taken on the line $x$ $x$, Fig. 4. Fig. 4 is an inner side view of one end of one of the parts of a link; and Fig. 5 is a sectional view taken on the line $x'$ $x'$, Fig. 4, the two parts of the link, however, being shown.

Referring to Fig. 2, one form of a separable link is shown, composed of two like sections of cast or wrought metal. Each section comprises a central shank $a$ and hook-like ends $a'$, turned preferably in the same direction, the inner faces of the sections being flattened, so that when brought into alinement they will rest closely one upon the other, as in Figs. 1, 3, and 5. The open sides of the hooks of each section are turned toward each other, and the sections may be permanently connected by a pivot $b$, while suitable rivets or screws, as 2, may be inserted in holes 5 in other parts of the sections when brought together, as in Fig. 1. When so brought together or closed, the solid portion of the hook $a'$ of one section overlaps and closes the opening $a^2$ of the hook of the other section, completing the ring or annulus at each end of the link.

If desired, the separable links may be inserted between solid links previous to the insertion of the pivot $b$, each section being separately hooked into the ring of the solid link before closing the sections.

The greatest and most constant wear in a chain comes upon the contacting portions of two adjacent links, and in consequence the more nearly a lubricant is applied to and retained at such points the greater its efficiency and the longer the life of the chain.

In order to lubricate the chain, I recess the ring-like or curved portion of the link and insert in such recess a section of a solid or non-liquid lubricant, the bearing portion of the adjacent link rubbing over the exposed portion of the lubricant and distributing it over the wearing-surfaces as needed.

In the separable links I have herein shown a substantially crescent-shaped recess $c$, formed in the inner face of preferably each section, at the inner or bearing portion of the hook or ring, and I insert therein a section $d$ of the lubricant, pressing or molding it thereinto, according to its nature, and I have found a mixture of sulfur and graphite, incorporated by heat, to form a most efficient lubricant, though other lubricants may be used, if desired.

Both ends of the link may be supplied with a lubricating-section, if desired, or only one end of each link may be so provided, and the lubricant may be inserted in each recess before the link-sections are closed, or a single portion can be put in after the said closure.

By an inspection of Figs. 3 to 5 it will be seen that the exposed surface of the lubricant is substantially flush with the adjacent metal forming the bearing of the link end, and the rubbing of the wearing parts of adjacent links distributes the lubricant as needed, the lubricant $d$ wearing away slowly with the metal of the link, the wear of the latter being greatly retarded by the lubricant and in consequence increasing the life of the chain, and also providing easy movement of the parts upon each other.

If desired, the links may be made with hooks at one end of the section and closed rings, as $a^\times$, at the other, one of such links being shown in Fig. 1.

It will be obvious that the links may be cast or wrought solid, a recess being formed in the bearing portion to receive a section of the lubricant, if desired.

If each link be provided at one end only with the lubricant, the unlubricated end thereof will engage the lubricated end of the connected adjacent link, and so on throughout the chain.

Every other link may have the lubricant in each end, and the intervening links will not have any lubricant at all in their ends, but it is obvious that the effect will be the same in either case—viz., a portion of the lubricant at the engaging ends of every two links.

I claim—

1. As a new article of manufacture, a chain-link having a rounded end adapted to receive therein the connecting portion of the next adjacent link, and provided with a recess open at its inner side within said end, and solidified lubricating material inserted in said recess and having an exposed surface to contact with the connecting portion of the next link, the parts being so arranged that the link end receives all the thrust and wear on either side of said recess, the said connecting portion wearing off said lubricant sufficient for lubricating purposes and to keep the same substantially flush with the said adjacent sides, substantially as described.

2. A separable chain-link, consisting of like sections, each comprising a central elongated shank and hook-like ends turned in the same direction, the inner faces of said sections being plane to rest closely one upon the other when brought into alinement, a pivot for said sections, and retaining-fastenings, the open sides of the hooks of the two sections being turned in opposite directions, whereby the opening in each hook is closed when the sections are brought together, substantially as described.

3. A separable chain-link, consisting of like sections each provided at one end with a hook, the openings of said hooks being turned in opposite directions, each hook having in its inner face a recess to register one with the other when the sections are closed, to thereby form a pocket adapted to receive a solid lubricant, substantially as described.

4. A separable chain-link, consisting of like sections, each comprising a central elongated shank and hook-like ends turned in the same direction, a pivot for said sections, the open sides of the hooks of the two sections being turned in opposite directions, whereby the opening in each hook is closed when the sections are brought together, substantially as described.

In testimony whereof I have signed my name to this specification in the presence of two subscribing witnesses.

AMBROSE J. B. BERGER.

Witnesses:
JOHN C. EDWARDS,
AUGUSTA E. DEAN.